(12) United States Patent
Long et al.

(10) Patent No.: US 8,995,253 B2
(45) Date of Patent: Mar. 31, 2015

(54) METHOD, APPARATUS AND SYSTEM FOR RING PROTECTION

(75) Inventors: Hao Long, Shenzhen (CN); Yang Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 398 days.

(21) Appl. No.: 13/207,033

(22) Filed: Aug. 10, 2011

(65) Prior Publication Data

US 2011/0292789 A1 Dec. 1, 2011

Related U.S. Application Data

(63) Continuation of application No. 12/403,451, filed on Mar. 13, 2009, now Pat. No. 8,031,590, which is a continuation of application No. PCT/CN2008/070158, filed on Jan. 22, 2008.

(30) Foreign Application Priority Data

Jan. 23, 2007 (CN) .......................... 2007 1 0073031

(51) Int. Cl.
*H04L 12/26* (2006.01)
*H04L 12/437* (2006.01)
(Continued)

(52) U.S. Cl.
CPC .............. *H04L 12/437* (2013.01); *H04L 45/02* (2013.01); *H04L 45/18* (2013.01); *H04L 45/22* (2013.01); *H04L 45/28* (2013.01); *H04L 45/48* (2013.01); *H04L 12/4637* (2013.01)
USPC .......................................... 370/225; 370/258

(58) Field of Classification Search
CPC ..... H04L 12/4637; H04L 45/02; H04L 45/18; H04L 45/22; H04L 45/28; H04L 45/48; H04L 12/437
USPC ........................... 370/216–229; 714/716–717
See application file for complete search history.

(56) References Cited

U.S. PATENT DOCUMENTS

| 6,625,115 B1 | 9/2003 | Ikeda et al. |
| 6,766,482 B1 | 7/2004 | Yip et al. |

(Continued)

FOREIGN PATENT DOCUMENTS

| CN | 1543136 A | 11/2004 |
| CN | 1604545 A | 4/2005 |

(Continued)

OTHER PUBLICATIONS

ITU-T Telecommunication Standardization Sector of ITU, "Series G: Transmission Systems and Media, Digital Systems and Networks, Packet over Transport aspect—Ethernet over Transport aspects, Series Y: Global Information Infrastructure, Internet Protocol Aspects and Next-Generation Networks", G.8032/Y.1344, pp. i-iv and 1-91, (Mar. 2010).

(Continued)

*Primary Examiner* — Gary Mui
(74) *Attorney, Agent, or Firm* — Leydig, Voit & Mayer, Ltd.

(57) ABSTRACT

A method, apparatus and system for Ethernet Ring Protection (ERP) are disclosed. The method includes: detecting, by a node, a link fault on a ring; blocking, by the node, a port connected with the faulty link after detecting the link fault, and sending a fault alarm message to other nodes on the ring, wherein the fault alarm message contains a fault identifier; and judging, by a node which receives the fault alarm message, whether the fault identifier changes; if the fault identifier changes, the node which receives the fault alarm message storing the fault identifier contained in the fault alarm message and clearing a forwarding table of the node which receives the fault alarm message.

14 Claims, 6 Drawing Sheets

(51) Int. Cl.
*H04L 12/751* (2013.01)
*H04L 12/705* (2013.01)
*H04L 12/707* (2013.01)
*H04L 12/703* (2013.01)
*H04L 12/753* (2013.01)
*H04L 12/46* (2006.01)

(56) References Cited

U.S. PATENT DOCUMENTS

| | | | |
|---|---|---|---|
| 6,801,506 B1 | 10/2004 | Dey | |
| 6,973,023 B1 | 12/2005 | Saleh et al. | |
| 7,440,397 B2 | 10/2008 | Tsurumi et al. | |
| 7,706,254 B2 | 4/2010 | Moore et al. | |
| 8,483,050 B2 * | 7/2013 | Hao | 370/222 |
| 8,520,507 B1 * | 8/2013 | Shah | 370/222 |
| 2005/0207348 A1 | 9/2005 | Tsurumi et al. | |
| 2006/0098571 A1 | 5/2006 | Takefman | |
| 2006/0165002 A1 * | 7/2006 | Hicks et al. | 370/248 |
| 2006/0215544 A1 | 9/2006 | Asa et al. | |
| 2007/0076590 A1 | 4/2007 | Galpin et al. | |
| 2007/0253330 A1 | 11/2007 | Tochio et al. | |
| 2008/0101219 A1 * | 5/2008 | Rose et al. | 370/224 |
| 2009/0296569 A1 | 12/2009 | Ramalho Ribeiro Dos Santos et al. | |

FOREIGN PATENT DOCUMENTS

| | | | |
|---|---|---|---|
| CN | 1812300 A | | 8/2006 |
| CN | 1812361 A | | 8/2006 |
| CN | 1859220 A | | 11/2006 |
| CN | 1859411 A | | 11/2006 |
| CN | 1909496 A | | 2/2007 |
| CN | 101232428 B | | 5/2012 |
| EP | 1511243 A1 | | 3/2005 |
| EP | 1727313 A1 | | 11/2006 |
| EP | 1 729 453 A1 | | 12/2006 |
| WO | WO 03/077459 A2 | | 9/2003 |
| WO | WO 2006/077001 A1 | | 7/2006 |
| WO | WO 2007/107066 A1 | | 9/2007 |

OTHER PUBLICATIONS

PCT International Preliminary Report on Patentability which encloses an English Translation of the PCT Written Opinion of the International Searching Authority for International Application No. PCT/CN2008/070158, mailed May 8, 2008, 5 pgs.

First Office Action from the State Intellectual Property Office of the PRC for Application No. 2007100730292, dated Sep. 10, 2007, 8 pgs.

First Chinese Office Action dated (mailed) Sep. 14, 2010, issued in related Chinese Application No. 200880001030.7, Huawei Technologies C., LTD (4 pages).

Supplementary European Search Report mailed Jul. 14, 2009, in EP Application No. 0870014.0-2416.

International Search Report from P.R. China in International Application No. PCT/CN2008/070158 mailed May 8, 2008.

International Search Report issued in related Application No. PCT/CN2006/003795 mailed Apr. 12, 2007.

Office Action dated Oct. 20, 2010, from the USPTO issued in related U.S. Appl. No. 12/430,451, filed Mar. 13, 2009; Hao Long.

1st Office Action in related Chinese Application No. 200710073029.2. (Jan. 8, 2010).

Written Opinion of the International Searching Authority in related Application No. PCT/CN2007/070864 (Jan. 24, 2008).

European Patent Office Communication pursuant to Article 94(3) EPC, European search opinion for Application No. 07817055.2 (Jan. 27, 2011).

Supplementary European Search Report for Application No. 07817055.2. (Aug. 14, 2009).

International Search Report from P.R. China in International Application No. PCT/CN2007/070864 (Jan. 24, 2008).

* cited by examiner

METHOD, APPARATUS AND SYSTEM FOR RING PROTECTION

CROSS-REFERENCE TO RELATED APPLICATIONS

This application is a continuation of the U.S. patent application Ser. No. 12/403,451, filed on Mar. 13, 2009, now U.S. Pat. No. 8,031,590 which is a continuation of International Application No. PCT/CN2008/070158, filed on Jan. 22, 2008. The International Application claims priority to the Chinese Patent Application No. 200710073031.X, filed on Jan. 23, 2007. The afore-mentioned patent applications are hereby incorporated by reference in their entireties.

BACKGROUND

1. Field of the Invention

The present invention relates to Ethernet technologies, and in particular, to a method, apparatus and system for ring protection.

2. Description of the Related Art

With the rapid development of the carrier-class Ethernet, the Ethernet Ring Protection (ERP) becomes an Ethernet service protection method that attracts wide attention in the industry. Based on a physical or logical ring topology, the ERP uses a closed loop and Ethernet features to achieve fast protection switching for point-to-point, point-to-multipoint, and multipoint-to-multipoint services. The ERP is characterized by high utilization ratio of bandwidth, high speed of protection switching, low cost of network construction, and support of point-to-multipoint and multipoint-to-multipoint service switching.

The Ethernet ring network uses a ring topology on the link layer. In order to prevent routing a packet as an infinite loop on an Ethernet ring, a blocked port is set on the link layer. When the service packet passes through the blocked port, the blocked port discards the packet. Generally, the same physical topology may correspond to multiple ring instances, and each ring instance has a corresponding blocked port. A ring instance may correspond to a control Virtual Local Area Network (VLAN) and one or a group of service VLAN(s). It should be noted that, the control VLAN is generally used to transmit the control messages of ring instances, and the blocked port does not block the packet and traffic on the control VLAN. FIG. 1 shows an Ethernet ring network in the prior art. As shown in FIG. 1, nodes A to F on the ring network are Ethernet bridges. Port 10 of node B is a blocked port. Normally, when a service packet passes through the blocked port, the service packet is discarded by the blocked port. Generally, the node where a blocked port is located is known as a master node.

In a technical solution in conventional art, an Ethernet Operation Administration and Maintenance (OAM) is used to detect link faults and generate fault alarms, and take protection actions according to fault conditions. The specific process is as follows:

A Continuity Check (CC) packet is sent between adjacent nodes on the ring. If no CC packet is received within a specified period, the link is determined as faulty. If a CC packet is received again after fault occurrence, the link is determined as recovering from the fault.

In the technical solutions in the conventional art, the fault detection methods are similar, but the specific protection switching modes are different. The protection switching mode either needs to define new alarm messages, which is incompatible with the existing Ethernet OAM standard, or makes fault recovery scarcely possible in the case of multi-point faults on the Ethernet ring.

SUMMARY

Accordingly, a method, apparatus and system for ring protection are disclosed in an embodiment of the present disclosure to implement ERP in a simple way without changing the existing Ethernet OAM mechanism, and avoid frequent clearing of a forwarding table.

A ring protection method provided according to an embodiment of the present disclosure includes:

detecting, by a node, a link fault on a ring;

blocking, by the node, a port connected with the faulty link after detecting the link fault, and sending a fault alarm message to other nodes on the ring, wherein the fault alarm message contains a fault identifier; and judging, by a node which receives the fault alarm message, whether the fault identifier changes; if the fault identifier changes, the node which receives the fault alarm message storing the fault identifier contained in the fault alarm message and clearing a forwarding table of the node which receives the fault alarm message.

A ring protection apparatus on a node in a ring according to an embodiment of the present disclosure includes:

an alarm message processing module, adapted to: receive a fault alarm message and forward the fault alarm message downstream, extract a fault identifier from the received fault alarm message, and send the fault identifier to a fault information storing module;

the fault information storing module, adapted to: store fault information which includes received fault identifier; and a judging module, adapted to: judge, according to the fault identifier in the fault alarm message and the fault identifier stored in the fault information storing module, whether the fault identifier changes; and if the fault identifier changes, instruct a forwarding table flushing module to clear a forwarding table of the node.

A ring protection system provided according to an embodiment of the present disclosure includes:

a node which detects a link fault on a ring, adapted to block a port connected with the faulty link after detecting the link fault, and send a fault alarm message to an other node on the ring; and the other node on the ring, adapted to judge, according to the received fault alarm message, whether a fault identifier contained in the fault alarm message changes, and if the fault identifier changes, store the fault identifier and clear a forwarding table of the other node.

DETAILED DESCRIPTION

For a better understanding of this disclosure, the following description takes an Ethernet ring as an example to describe in detail with reference to accompanying drawings.

In the embodiments of the present invention, the node which detects a link fault sends a fault alarm message periodically; the node which receives the fault alarm message records and maintains a fault identifier of the node, where the fault identifier is a source address pair of the fault alarm message received from two ports. When the fault identifier maintained by the node changes, the node clears a forwarding table and thus restarts self-learning. The fault alarm message may be an Alarm Indication Signal (AIS) message or an Automatic Protection Switching (APS) message. The embodiments use MS message as the fault alarm message.

Figure 1:
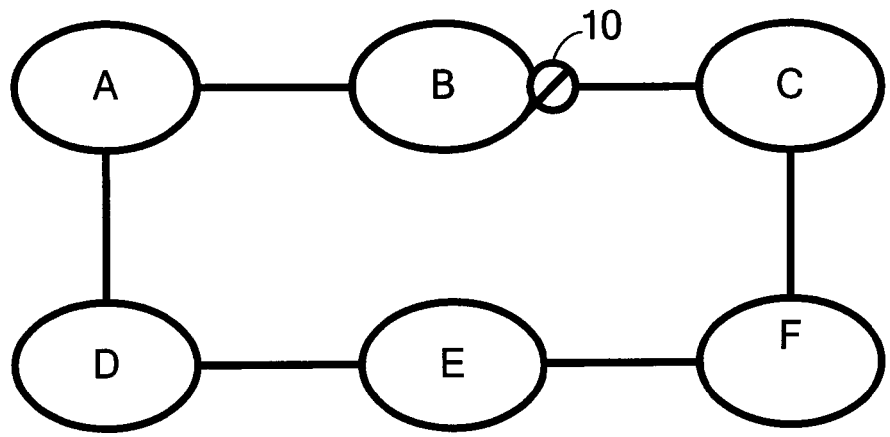
FIG. 1 shows an Ethernet ring network in the prior art.
Figure 2:
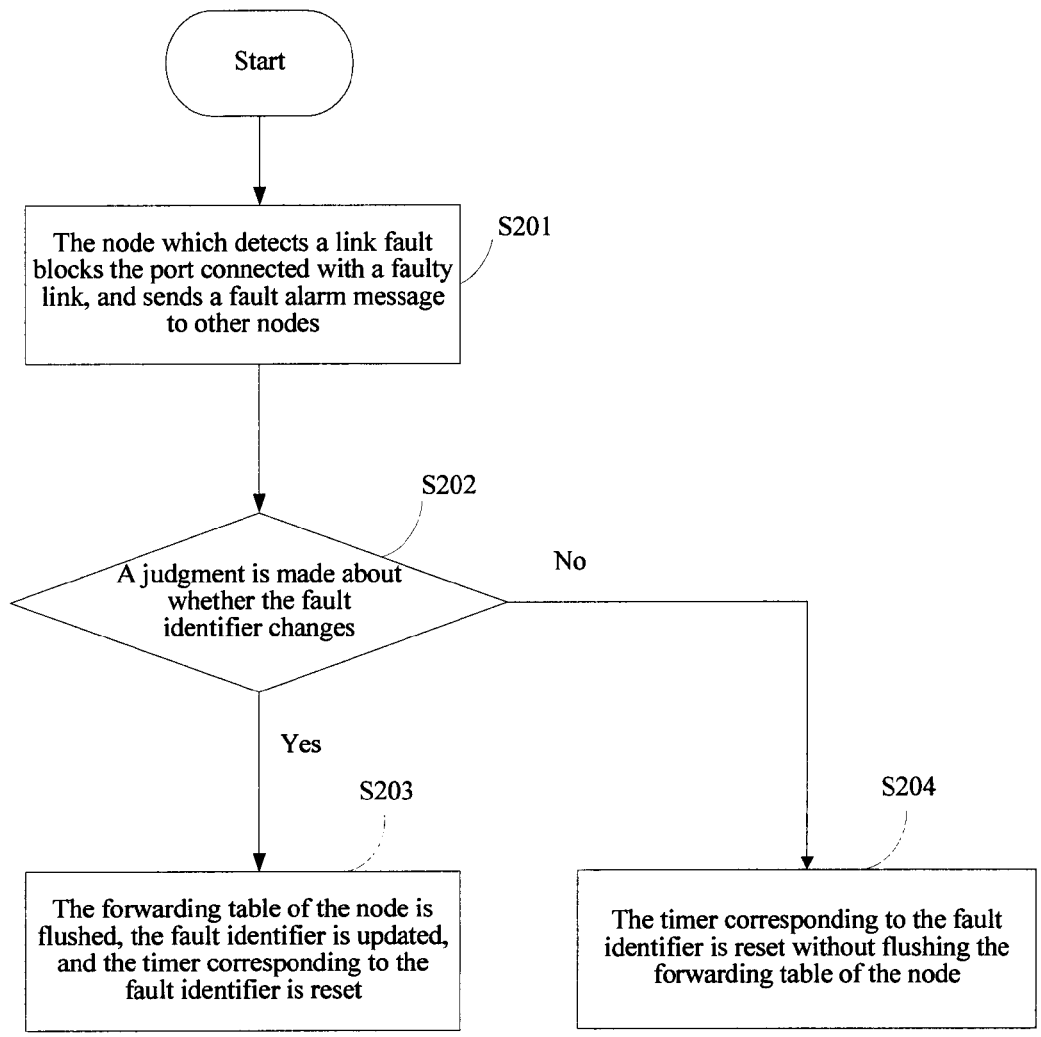
FIG. 2 is a flowchart of a ring protection method according to an embodiment of the present disclosure.

FIG. 2 is a flowchart of a ring protection method according to an embodiment of the present invention. The method includes:

Step S201: When a link fault occurs on an Ethernet ring, a node which detects the link fault blocks a port which is connected with the faulty link after detecting the link fault, the node sends a fault alarm message to other nodes on the ring.

Step S202: The other nodes judge, according to the received fault alarm message, whether a fault identifier contained in the fault alarm message changes. If the fault identifier changes, the process proceeds to step S203; otherwise, the process proceeds to step S204.

Step S203: A forwarding table of a node which received the fault alarm message is cleared, the fault identifier is updated, and a timer corresponding to the fault identifier is reset.

Step S204: The timer corresponding to the fault identifier is reset, without clearing the forwarding table of the node which received the fault alarm message.

Once detecting that the faulty link recovers, the node which received the fault alarm message stops sending the fault alarm message. If the node fails to receive the fault alarm message within a specified period, the node clears the fault identifier and clears the forwarding table, and the original blocked ports are blocked again.

The foregoing ERP method is applicable to protection in the case where one or more link faults occur on the Ethernet ring network, protection in the case where faults recover, and protection in the case where faults occur or recover on a link shared by two rings. The embodiments of the present invention in different circumstances are detailed below.

Figure 3:
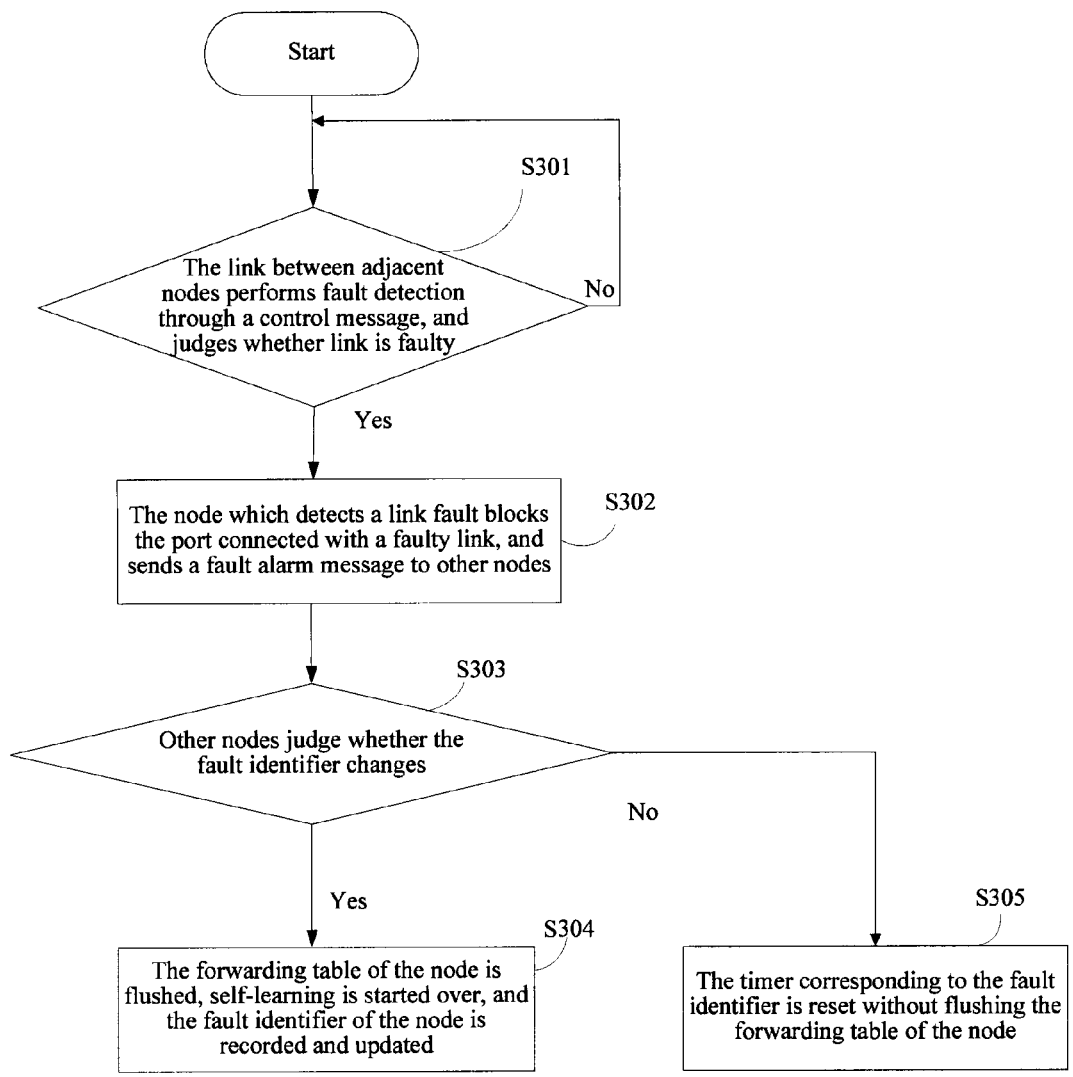
FIG. 3 is a flowchart of another ring protection method disclosed in an embodiment of the present disclosure.

FIG. 3 is another flowchart of a ring protection method disclosed in an embodiment of the present invention:

Step 301: The link between adjacent nodes performs fault detection through a control message, and judges whether the link is faulty. If the link is faulty, the process proceeds to step S302; otherwise, the process proceeds to block 301.

The control message may be a CC packet, and the CC packet may be used to detect faults among nodes on the Ethernet ring network. Each node sends a CC packet to its adjacent node periodically, and the adjacent node which received the CC packet terminates the packet directly, without forwarding the packet to any other nodes. If the adjacent node fails to receive the CC packet within a preset period, the link between the node and the adjacent node is determined as faulty.

Step S302: The node which detected link fault sends a fault alarm message to the other nodes in the ring on the Ethernet ring network periodically. The fault alarm message may be an Ethernet AIS message or an APS message, and is transmitted through a control VLAN.

Figure 4:
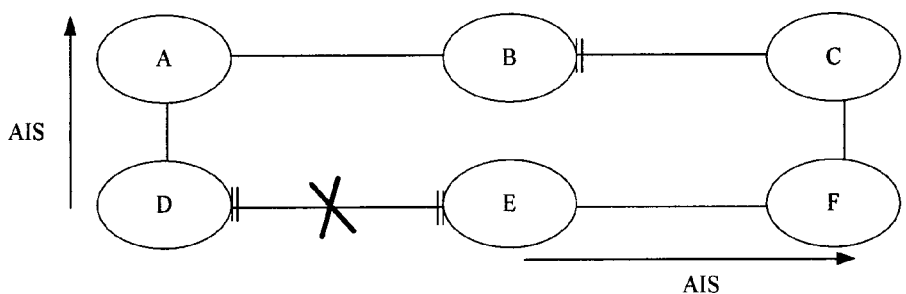
FIG. 4 is a schematic diagram showing how a node which detects a fault sends an alarm message according to an embodiment of present disclosure.

FIG. 4 shows how a node which detected link fault sends a fault alarm message. As shown in FIG. 4, if nodes D and E do not receive a CC packet from the adjacent node within a preset period, the link is determined as faulty. Therefore, nodes D and E block the port which is connected with the faulty link, and send an MS message to the other nodes in the Ethernet ring network periodically.

Referring to FIG. 3, Step S303: After receiving the fault alarm message, a node which received the fault alarm message judges whether the fault identifier changes. If the fault identifier changes, the process proceeds to step S304; otherwise, the process proceeds to step S305.

The fault identifier may be a source address pair of the fault alarm message received by two ports which are connected with the faulty link on the ring. The fault identifier may be alarm identifier information carried in the fault alarm message, which requires extending of the format of the fault alarm message such as MS message.

Figure 5:
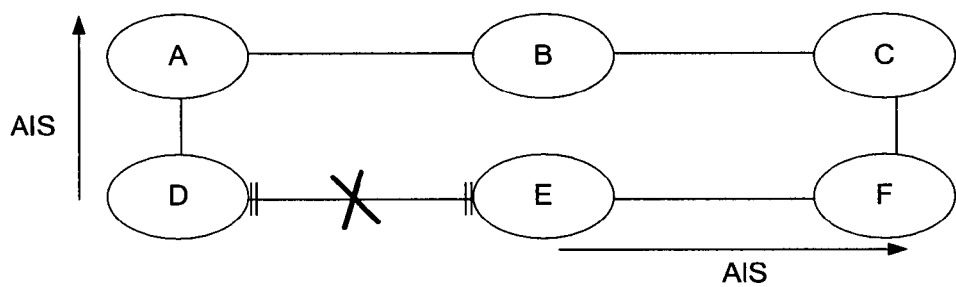
FIG. 5 is a schematic diagram showing how the nodes receive an MS message according to a first embodiment of the present disclosure.

FIG. 5 shows how the nodes receive an MS message in a first embodiment of the present invention. As shown in FIG. 5, after a node on the ring network receives an MS message, the node shifts from a normal state to a faulty state, clears the forwarding table, records the source address of the MS messages received from eastbound and westbound ports, and forwards the AIS messages to the other nodes in the ring. If the node which receives the AIS message is a node where the normally blocked port is located (for example, node B in FIG. 5), the normally blocked port needs to be unblocked.

Specifically, the two nodes D and E which detected the link fault send an MS message to the other nodes in the ring. Therefore, nodes A, B, C and F receive two different MS messages from the eastbound port and westbound port. In this way, each node records the source addresses of the two MS messages, and makes them into a source address pair. In this embodiment, the source address pair may serve as the fault identifier. The source address pair may be expressed as <source address of alarm message received from westbound port, source address of alarm message received from eastbound port>. Certain aging time is set for the fault identifier. The aging time may be 1.5 to 3 times as much as the MS message period, and is generally implemented by setting a timer.

In this embodiment, at the beginning, the ring is in the normal state and the maintained fault identifier is null. Therefore, the change of the fault identifier is detectable. Moreover, in this embodiment, in order to avoid two clearing operations performed after receiving MS messages on both sides at the time of the initial fault, the following two modes are applied:

Mode 1: If the fault table is not null. Namely, the record kept by the current node shows that the ring is in the faulty state, whereas the source address of the alarm message corresponding to a port changes from a null value to a non-null value, reset the timer without clearing the forwarding table.

Mode 2: The forwarding table is cleared only if both sides receive alarm messages. That is, the source addresses of the MS messages corresponding to the two ports on the ring are not null. In practice, if the source address of the MS message corresponding to only one of the ports is not null, the link is set to a pre-faulty state; if neither of the source address of the AIS messages corresponding to the ports is null, the link is set to a faulty state. The forwarding table is not cleared for shifting from a normal state to a pre-faulty state, and the forwarding table is cleared for shifting from a pre-faulty state to a faulty state.

The mode of detecting change of the fault identifier may be: judging whether the source address of the AIS message received by the corresponding port is changed; if the source address is changed, the fault identifier is determined as changed.

Step S304: The forwarding table of the node which received the fault alarm message is cleared, self-learning is restarted, and the fault identifier of the node is recorded and updated.

In this embodiment, the node which received the fault alarm message do not store fault identifier in the normal state; when a link is faulty, the node extracts the source address of the MS message from the AIS message, and stores the source address as a fault identifier. In this case, the fault identifier is determined as changed, and it is necessary to clear the forwarding table of the node and thus restart self-learning.

Step S305: The timer corresponding to the fault identifier is reset, without clearing the forwarding table of the node.

In this embodiment, when the node on the ring network detects a fault recovery, the method further includes the following:

when the node detects a fault recovery, for example, when nodes D and E can receive the CC packet from the opposite party, the node stops sending the MS message;

if adjacent nodes fail to receive the MS message within a specified period, the link is determined as recovering from the fault. In this case, the fault identifier is cleared (for example, through an aging mechanism of the fault identifier). The node determines that the ring has shifted from the faulty state to the normal state, and clears the forwarding table. Besides, if the node is the node where the normally blocked port is located, the normally blocked port needs to be blocked again; if the node is the node connected with the faulty link, the port connected with the faulty link is unblocked again.

The following further describes a second embodiment of the present invention, which assumes that multiple faults and recovery from multiple faults may occur on the Ethernet ring network.

In this embodiment, when the node detects a link fault, the processing is the same as that of the first embodiment, and is not repeated here any further. The second embodiment differs from the first embodiment in that: If another link is faulty while one link has not recovered from the fault in the first embodiment, the node on the ring network judges whether the fault identifier changes after receiving the MS message. If the fault identifier changes, the node clears the forwarding table and thus restarts self-learning. This process is detailed below with reference to accompanying drawings.

Figure 6:
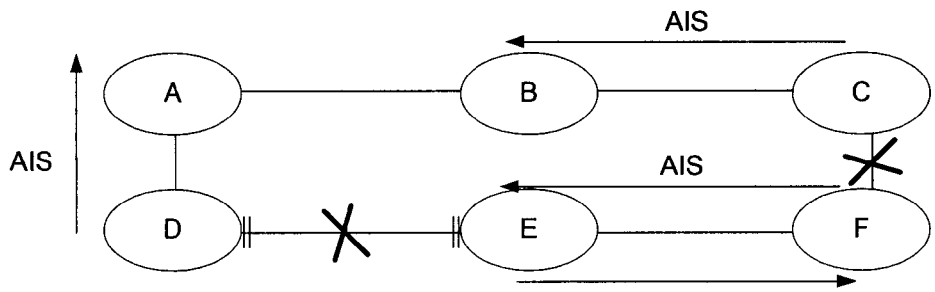
FIG. 6 is a schematic diagram showing multiple faults on an Ethernet ring according to a second embodiment of the present disclosure.

FIG. 6 shows multiple faults on an Ethernet ring in the second embodiment of the present invention. As shown in FIG. 6, when the link between node D and node E has not recovered from a fault, the fault identifier maintained by the normal nodes is <E, D>. When a link between node C and node F is faulty, the port connected with the faulty link between node C and node F is blocked. Meanwhile, nodes C and F generate new MS messages and send the messages to adjacent nodes. In this case, the original ring network is split by two link faults into two segments of a chain topology. The westbound port of nodes A, B and D may receive the MS messages from node D, and the eastbound port may receive the MS messages from node C. Therefore, the fault identifier of nodes A, B and D changes to <C, D>. Similarly, the fault identifier of nodes E and F changes to <E, F>. In this case, the node detects change of the fault identifier, clears the forwarding table and thus restarts self-learning. The mode of detecting change of the fault identifier is: judging whether the source address of the MS message received by the corresponding port in the fault table is changed; if the source address is changed, the fault identifier is determined as changed.

Figure 7:
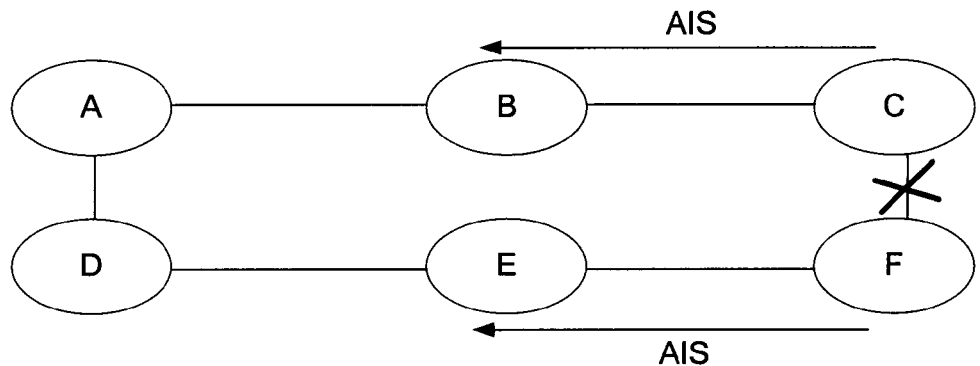
FIG. 7 is a schematic diagram showing recovery of one fault after multiple faults occur on an Ethernet ring according to the second embodiment of the present disclosure.

FIG. 7 shows a recovery of one fault after multiple faults occur in the second embodiment of the present invention. As shown in FIG. 7, after the link between node D and node E recovers, node D and node E stop sending the AIS message to adjacent nodes. The fault identifier of nodes A, B, D and E on the ring changes to <C, F>. In this case, the node detects change of the fault identifier, clears the forwarding table and thus restarts self-learning.

Embodiment 3

The third embodiment differs from the first and the second embodiments in that: the nodes which receive the fault information may not store or update the fault identifier composed of the source addresses of the fault alarm messages, but only confirm the normal state or the faulty state. After receiving a fault alarm message in the normal state, the node which received the fault alarm message clears the forwarding table and thus restarts self-learning. After receiving a fault alarm message in the faulty state, the node which received the fault alarm message resets the timer corresponding to the faulty state without clearing the forwarding table.

Further, if adjacent nodes do not receive fault alarm messages within the preset period any more, the node shifts from the faulty state to the normal state, and clears the forwarding table of the node.

Embodiment 4

The fourth Embodiment differs from the above embodiments in that: the source addresses of the fault messages are stored as a fault identifier based on the port.

After receiving a fault alarm message from an on-ring port, the node judges whether the currently maintained source address of the fault alarm message corresponding to the port has changed. If the source address has changed, the node clears the forwarding table entry which uses this port as an egress port, updates the source address of the fault alarm message corresponding to the port, and resets the corresponding timer. Otherwise, it is only necessary to reset the corresponding timer without clearing the forwarding table. Besides, if the port is a normally blocked port, the port needs to be unblocked.

Further, if the node does not receive a fault alarm message from an on-ring port, if the fault identifier corresponding to the port is aged, the node clears the forwarding table entry which uses this port as an egress port. Besides, if the port is a normally blocked port, the port needs to be blocked.

Embodiment 5

The fifth embodiment of the present invention is described below, which assumes that two Ethernet rings are interconnected through a shared link.

Figure 8:
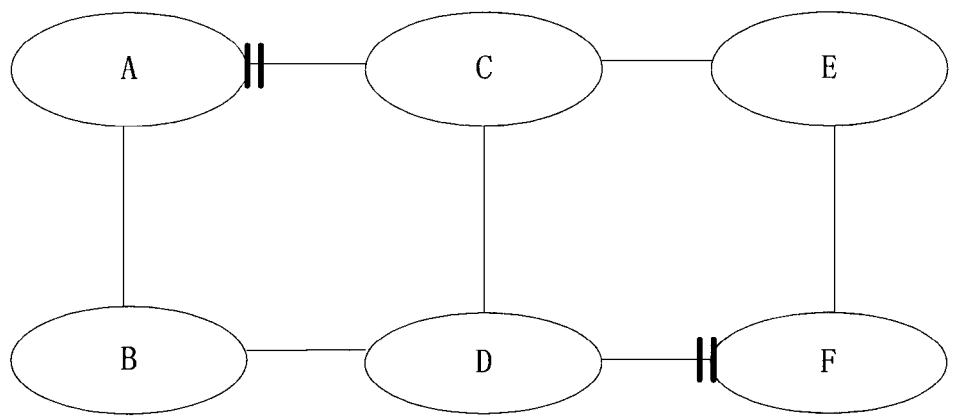
FIG. 8 is a schematic diagram showing a shared link between two Ethernet rings according to a fifth embodiment of the present disclosure.

FIG. 8 shows two Ethernet rings interconnected through a shared link in the fifth embodiment of the present invention. As shown in FIG. 8, nodes A, B, C, D, E and F may be Ethernet bridges, where nodes A, B, C and D form an Ethernet ring instance, while nodes C, D, E and F form another Ethernet ring instance, and the link between node C and node D is a shared link between two Ethernet rings, and two ring instances have different control VLANs and their respective normally blocked ports. When non-shared links on two Ethernet rings are faulty, the processing on each node is similar to that in the first and the second embodiments. The node which detected the non-shared link fault sends a fault alarm message to adjacent nodes; the node which received the fault alarm message judges whether the local fault identifier information changes: if the local fault identifier information changes, the node clears the forwarding table and restarts self-learning. Therefore, in this embodiment, the processing performed when a non-shared link fails on two Ethernet rings is not detailed here any further. Detailed below is a protection method applied when a shared link between two Ethernet rings fails with reference to the accompanying drawings.

When two rings are connected through a shared link, a shared blocked port needs to be set on one of the shared nodes. The shared blocked port is not the port connected with the shared link, and is unblocked in normal conditions. The shared blocked port may be set on a shared node manually, or is automatically elected among the shared nodes.

Figure 9:
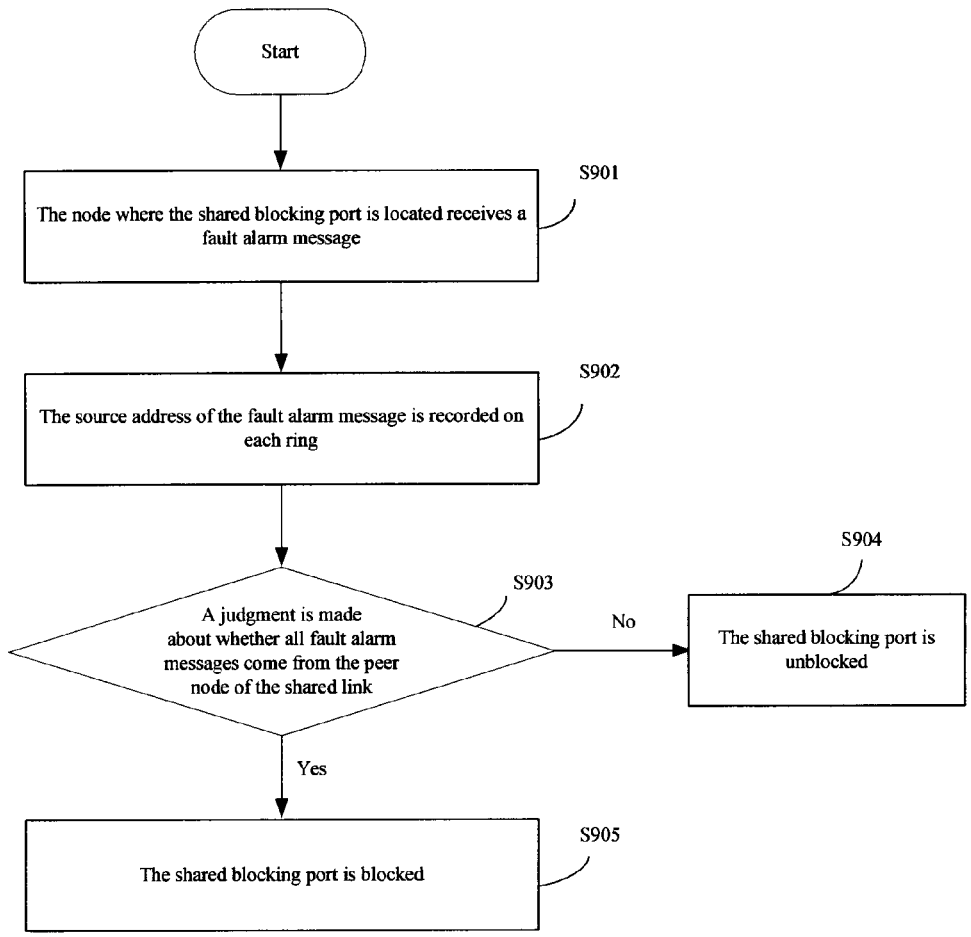
FIG. 9 is a schematic diagram showing a flowchart where the node containing the shared blocked port receives a fault alarm message after the shared link between two Ethernet rings is faulty according to the fifth embodiment of the present disclosure.

When a fault occurs on the ring, a fault alarm message is transferred on the ring. FIG. 9 shows a flowchart where the node containing the shared blocked port receives a fault alarm message after the shared link between two Ethernet rings is faulty in the fifth embodiment of the present invention. FIG. 9 illustrates only the operations for the shared blocked port. Other operations such as clearing the forwarding table and unblocking the normally blocked port are performed in the way described in the first embodiment or the fourth embodiment, and are not repeated here any further.

Step S901: The node where the shared blocked port is located receives a fault alarm message.

Step S902: The source addresses of the fault alarm messages received on all rings are recorded, and the source addresses of the fault alarm messages received on the ports are recorded.

Step S903: A judgment is made about whether all the fault alarm messages received on the two rings come from the node at a peer side of the shared link. If all the fault alarm messages received on the two rings come from the node at the peer side of the shared link, the process proceeds to step S904; otherwise, the process proceeds to step S905. In the judging process, the source address information in the fault alarm message may be compared with the information about the peer node of the shared link. If the source address information in the fault alarm message are the same as the information about the peer node of the shared link, it is deemed that all the fault alarm messages received on the two rings come from the node at the peer side of the shared link.

Step S904: The shared blocked port is blocked.
Step S905: The shared blocked port is unblocked.

At the time of a fault recovery, the node where the shared blocked port is located does not receive fault alarm message. In this case, the recorded information about the source address of the fault alarm message is aged. After such information is aged, the shared blocked port is unblocked again.

Figure 10:
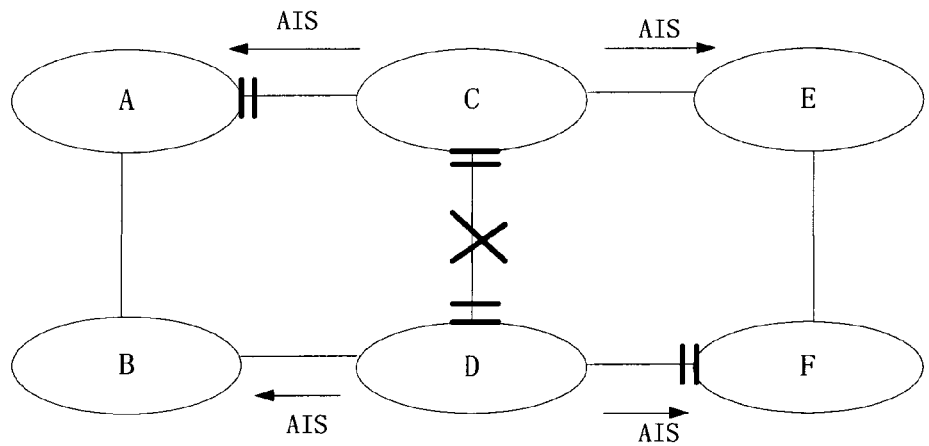
FIG. 10 is a schematic view showing the process in which a shared link between two Ethernet rings becomes faulty according to the fifth embodiment of the present disclosure.

FIG. 10 shows a fault of a shared link between two Ethernet rings in the fifth embodiment of the present invention. As shown in FIG. 10, in this embodiment, a shared blocked port is set on one of the shared nodes C and D. The shared blocked port is not the port connected with the shared link, and is unblocked in normal conditions. The shared blocked port may be set on a shared node manually, or is selected among the shared nodes. The shared link may perform link fault detection through the CC packet of the Ethernet OAM mechanism. After detecting a fault of the shared link, the shared nodes C and D block the port connected with the shared link, and generate a fault alarm message which is released on both rings.

Figure 11:
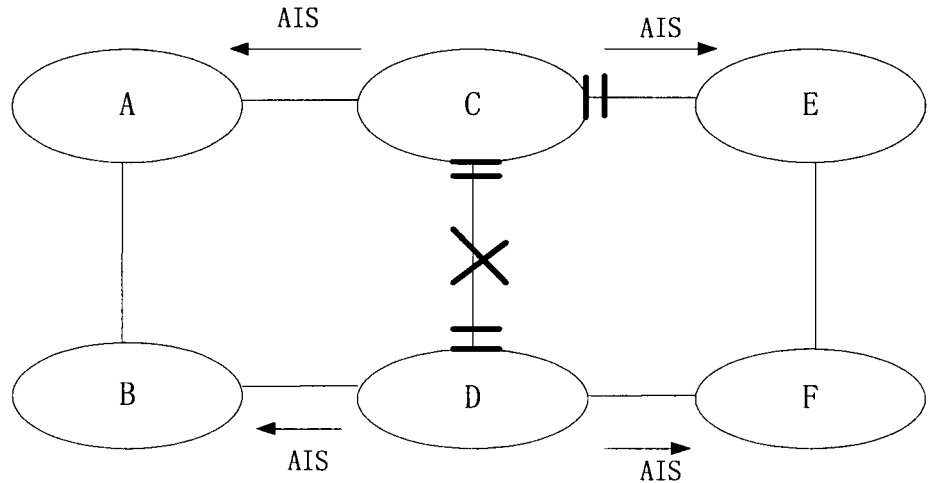
FIG. 11 shows a flowchart where each node receives a fault alarm message after the shared link between two Ethernet rings is faulty according to the fifth embodiment of the present disclosure.

FIG. 11 shows a flowchart where each node receives a fault alarm message after the shared link between two Ethernet rings is faulty in the fifth embodiment of the present invention. As shown in FIG. 11, after receiving the fault alarm message, each non-shared node on the two Ethernet rings clears its forwarding table, and unblocks the normally blocked port of each Ethernet ring. After receiving the fault alarm message from node D, the shared node C clears the forwarding table, and blocks the preset shared blocked port.

After detecting a fault recovery, the shared node stops sending the fault alarm message to adjacent nodes on the two Ethernet rings. If each node receives no fault alarm message within a set period, the node determines that the link has recovered from the fault, and therefore, clears the forwarding table and blocks the normally blocked port on each Ethernet ring again. If the shared node receives no fault alarm message from the peer shared node of the shared link within a set period, the node determines that the shared link fault is removed, and therefore, unblocks the shared blocked port.

Based on the same conception as the foregoing ERP method, an ERP apparatus is also disclosed. Because the apparatus and the method are based on the same conception of the invention, the embodiments of the apparatus have many identical or equivalent technical features, and such technical features are outlined only without detail elaboration.

Embodiment 6

Figure 12:
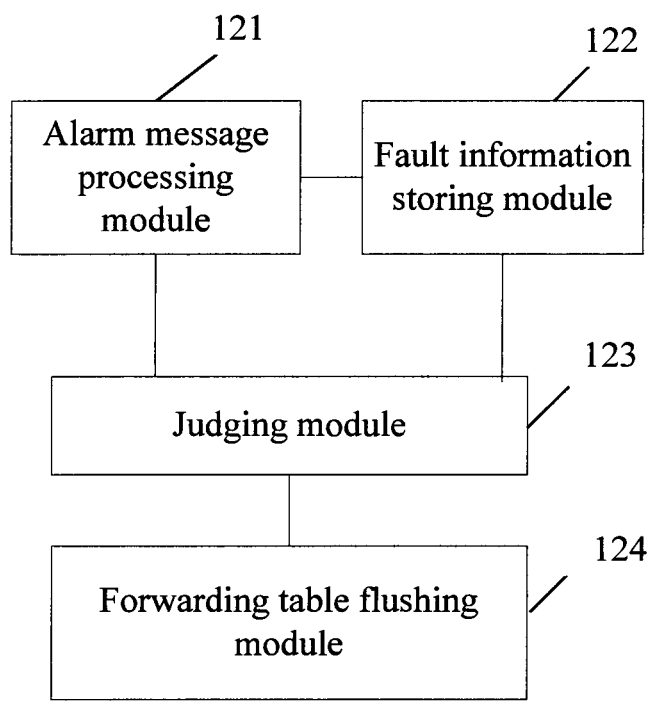
FIG. 12 shows a structure of a ring protection apparatus according to a sixth embodiment of the present disclosure.

FIG. 12 shows a structure of an ERP apparatus disclosed in the sixth embodiment of the present invention. The apparatus is located on each node of the ring network. As shown in FIG. 12, the apparatus includes:

an alarm message processing module 121, configured to receive a fault alarm message and forward the fault alarm message downstream, extract the source address of the fault alarm message from the received fault alarm message, and send the source address to a fault information storing module 122;

a fault information storing module 122, configured to store fault information which is a collection of source addresses of fault alarm messages received by the eastbound and westbound ports of the node, or store only the current state (namely, faulty state or normal state) of the node; and a judging module 123, configured to judge, according to the source address of the fault alarm message and the fault information stored in the fault information storing module 122, whether the fault information of the Ethernet ring network changes; and, when the fault information changes, instruct the forwarding table flushing module 124 to clear the forwarding table of the node and restart self-learning.

The process of using the apparatus to implement ERP is similar to that described in the foregoing embodiments of the present invention, and is not repeated here any further.

Embodiment 7

Figure 13:
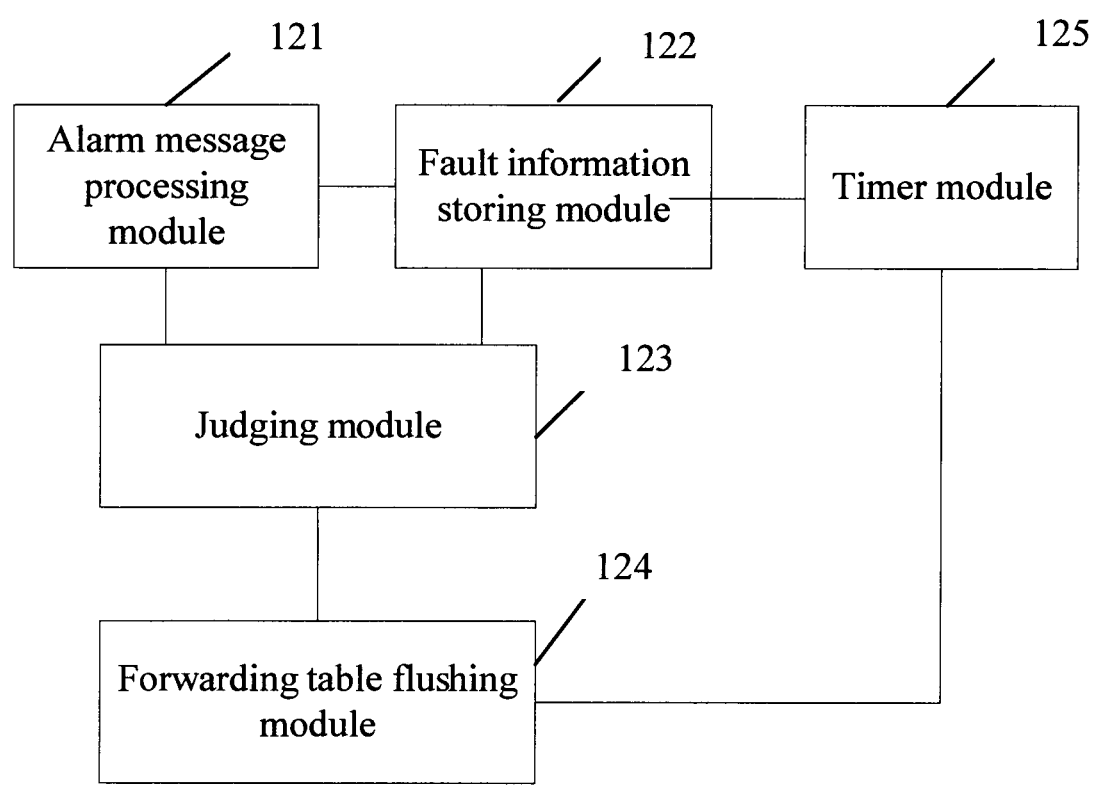
FIG. 13 shows a structure of a ring protection apparatus according to a seventh embodiment of the present disclosure.

FIG. 13 shows a structure of an ERP apparatus disclosed in the seventh embodiment of the present invention. As shown in FIG. 13, this embodiment differs from the sixth embodiment in that: The apparatus provided in this embodiment further includes a timer module 125, adapted to instruct the forwarding table flushing module 124 to clear the forwarding table of the node if the fault information stored in the fault information storing module 122 does not change within a preset period.

Through the embodiments of the present invention, the node which receives the fault alarm message stores the fault identifier or current state of the node, and uses the stored information to judge fault occurrence or fault recovery on the Ethernet ring network effectively. Therefore, the ERP is implemented without changing the existing Ethernet OAM mechanism, and the massive broadcast traffic caused by clearing the forwarding table frequently and restarting self-learning is avoided effectively. Therefore, the technical solution under the present invention is easy to use and highly compatible.

An embodiment of the present invention also provides a ring protection system, including:

a node which detects a link fault, configured to block the port connected with the faulty link after detecting that the link on the ring is faulty, and send a fault alarm message to the other nodes in the ring; and at least one of the other nodes, configured to judge, according to the received fault alarm message, whether its state changes from a normal state to a faulty state, and if the node changes from a normal state to a faulty state, clear the forwarding table of the node.

If the node, which detected the link fault, has a normally blocked port, the node which detected the link fault is further adapted to unblock the normally blocked port.

The node which detected the link fault is further adapted to stop sending fault alarm messages to adjacent nodes after a recovery of the faulty link.

The other nodes judge, according to the fault identifier maintained by the node or the current state of the node, whether a node which received fault alarm message changes from a normal state to a faulty state. Accordingly, the other nodes are further adapted to: clear the forwarding table of the node after determining that no more fault alarm message is received within the preset period, and delete the fault identifier stored in the node, or change from the faulty state to the normal state.

Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A ring protection method, comprising:
    detecting, by a first node in a ring, a link fault occurring in a link connected to a port of the first node;
    blocking, by the first node, the port connected to the link after detecting the link fault, and sending a fault alarm message to other nodes in the ring, wherein the fault alarm message contains an identifier that indicates the first node detecting the link fault;
    judging, by a second node which receives the fault alarm message, whether the identifier contained in the fault alarm message is different from a fault identifier record stored in the second node; and
    if the identifier contained in the fault alarm message is different from the fault identifier record stored in the second node, storing, by the second node which receives the fault alarm message, the identifier contained in the fault alarm message and clearing a forwarding table of the second node which receives the fault alarm message.

2. The method of claim 1, wherein the identifier contained in the fault alarm message comprises a source address of the fault alarm message.

3. The method of claim 1, further comprising: if the identifier contained in the fault alarm message is the same as the fault identifier record stored in the second node, resetting, by the second node which receives the fault alarm message, a timer corresponding to the fault identifier record without clearing the forwarding table.

4. A ring protection apparatus in a first node in a ring, the apparatus comprising:
    an alarm message processing module, configured to: receive a fault alarm message; forward the fault alarm message downstream; extract, from the received fault alarm message, an identifier indicating a second node that detects a link fault occurring in a link connected to a port of the second node; and send the identifier to a judging module;
    a fault information storing module, configured to store fault information which includes a collection of identifiers of received fault alarm messages; and
    the judging module, configured to: judge, according to the identifier extracted from the received fault alarm message and the fault information stored in the fault information storing module, whether the identifier extracted from the fault alarm message is different from the fault information stored in the fault information storing module; and if the identifier extracted from the fault alarm message is different from the fault information stored in the fault information storing module, instruct a forwarding table flushing module to clear a forwarding table of the first node in which the ring protection apparatus locates.

5. The apparatus of claim 4, wherein the identifier extracted from the received fault alarm message comprises a source address of the fault alarm message.

6. A ring protection system, comprising:
    a first node in a ring, configured to: detect a link fault occurring in a link connected to a port of the first node, block the port connected to the link, and send via the ring a fault alarm message containing an identifier that indicates the first node detecting the link fault; and
    a second node in the ring, configured to: receive the fault alarm message, judge, according to the received fault alarm message, whether the identifier contained in the fault alarm message is different from a fault identifier record stored in the second node, and if the identifier contained in the fault alarm message is different from the fault identifier record stored in the second node, store the identifier and clear a forwarding table of the second node which receives the fault alarm message.

7. The system of claim 6, wherein the identifier contained in the fault alarm message comprises a source address of the fault alarm message.

8. The system of claim 6, wherein the second node is further configured to: if the identifier contained in the fault alarm message is the same as the fault identifier record stored in the second node, reset a timer corresponding to the fault identifier record without clearing the forwarding table.

9. A ring protection method, comprising:
   receiving, by a first node, a fault alarm message containing an identifier indicating a second node that detects a link fault occurring in a link connected to a port of the second node;
   determining, by the first node that receives the fault alarm message, whether the identifier contained in the fault alarm message is different from a fault identifier record stored in the first node; and
   if the identifier contained in the fault alarm message is different from the fault identifier record stored in the first node, clearing, by the first node which receives the fault alarm message, a forwarding table of the first node which receives the fault alarm message.

10. The method of claim 9, wherein the identifier contained in the fault alarm message comprises a source address of the fault alarm messages.

11. The method of claim 9, further comprising:
    updating, by the first node which receives the fault alarm message, the fault identifier record stored with a pair of source addresses obtained from fault alarm messages received by two ports of the first node which receives the fault alarm messages.

12. The method of claim 9, wherein the fault identifier record stored is null when the first node is initialized.

13. The method of claim 9, further comprising:
    if the identifier contained in the fault alarm message is the same as the fault identifier record stored in the first node, resetting, by the first node, a timer corresponding to the fault identifier record without clearing the forwarding table.

14. A ring protection apparatus in a first node in a ring, the ring protection apparatus comprising:
    a receiver, configured to receive a fault alarm message containing an identifier indicating a second node that detects a link fault occurring in a link connected to a port of the second node;
    a first module, configured to determine whether the identifier contained in the fault alarm message is different from a fault identifier record stored in the first node; and
    a second module, configured to clear a forwarding table of the first node if the identifier contained in the fault alarm message is different from the fault identifier record stored in the first node.

* * * * *